United States Patent
Moon et al.

(10) Patent No.: US 9,332,590 B2
(45) Date of Patent: May 3, 2016

(54) WIRELESS COMMUNICATION APPARATUS AND METHOD FOR SELECTING A GROUP OF COORDINATED COMMUNICATION NODES BASED ON SIGNAL INTENSITIES AND DELAY TIMES OF SOURCE SIGNALS

(71) Applicant: ELECTRONICS AND TELECOMMUNICATIONS RESEARCH INSTITUTE, Daejeon (KR)

(72) Inventors: Young Jin Moon, Daejeon (KR); Seung Jae Bahng, Daejeon (KR); Youn Ok Park, Daejeon (KR); Dong Seung Kwon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/620,927

(22) Filed: Feb. 12, 2015

(65) Prior Publication Data
US 2015/0230287 A1    Aug. 13, 2015

(30) Foreign Application Priority Data
Feb. 12, 2014  (KR) .................. 10-2014-0015973

(51) Int. Cl.
  *H04W 88/08* (2009.01)
  *H04W 76/02* (2009.01)
(52) U.S. Cl.
  CPC ............ *H04W 88/085* (2013.01); *H04W 76/02* (2013.01)
(58) Field of Classification Search
  CPC . H04W 76/02; H04W 88/085; H04W 76/025; H04W 76/026
  See application file for complete search history.

(56) References Cited

U.S. PATENT DOCUMENTS

| | | | |
|---|---|---|---|
| 8,682,369 B2 | 3/2014 | Yang | |
| 2012/0149428 A1 | 6/2012 | Yang | |
| 2012/0178462 A1 | 7/2012 | Kim | |
| 2012/0213109 A1 | 8/2012 | Xu et al. | |
| 2013/0223272 A1* | 8/2013 | Tao | H04B 7/024 370/252 |
| 2014/0087720 A1* | 3/2014 | Takano | H04B 7/024 455/422.1 |
| 2014/0094169 A1* | 4/2014 | Takano | H04W 48/16 455/434 |
| 2014/0141832 A1* | 5/2014 | Liang | H04W 52/146 455/522 |
| 2014/0212129 A1* | 7/2014 | Huang | H04B 10/25 398/2 |
| 2015/0009845 A1* | 1/2015 | Takano | H04W 52/0206 370/252 |
| 2015/0009924 A1* | 1/2015 | Takano | H04L 5/0035 370/329 |
| 2015/0257118 A1* | 9/2015 | Siomina | G01S 5/021 455/456.1 |

FOREIGN PATENT DOCUMENTS

| KR | 10-2012-0081819 A | 7/2012 |
|---|---|---|
| KR | 10-2013-0049561 A | 5/2013 |
| KR | 10-2013-0085357 A | 7/2013 |

* cited by examiner

*Primary Examiner* — Bobbak Safaipour
*Assistant Examiner* — Devan Sandiford
(74) *Attorney, Agent, or Firm* — Rabin & Berdo, P.C.

(57) ABSTRACT

Disclosed is a base station that performs coordinated communication with a plurality of remote radio heads (RRHs), including: a communication unit receiving source signals from the plurality of remote radio heads; a measurement unit measuring signal intensities and delay times of the respective source signals; a selection unit selecting remote radio heads that will perform the coordinated communication among the plurality of remote radio heads based on the signal intensities and the delay times; and a demodulation unit demodulating source signals received from the selected remote radio heads.

10 Claims, 6 Drawing Sheets

WIRELESS COMMUNICATION APPARATUS AND METHOD FOR SELECTING A GROUP OF COORDINATED COMMUNICATION NODES BASED ON SIGNAL INTENSITIES AND DELAY TIMES OF SOURCE SIGNALS

CROSS-REFERENCE TO RELATED APPLICATIONS

This application claims priority to and the benefit of Korean Patent Application No. 10-2014-0015973 filed in the Korean Intellectual Property Office on Feb. 12, 2014, the entire contents of which are incorporated herein by reference.

TECHNICAL FIELD

The present invention relates to a base station and a communication system including the same, and a coordinated communication method of the base station.

BACKGROUND ART

A base station and a plurality of remote radio heads (RRHs) of a wireless communication system are positionally separated to be connected through an optical cable. The base station receives a signal transmitted in a terminal through the plurality of remote radio heads (RRHs). Each of the plurality of remote radio heads (RRHs) separated from each other may receive a signal transmitted from the terminal and the base station may increase a gain of a signal received through coordinated communication (CoMP) with the plurality of remote radio heads (RRHs).

However, since the plurality of remote radio heads (RRHs) receives source signals from the terminal at different positions, differences in signal intensities and delay times of the source signals received by the plurality of remote radio heads (RRHs) may occur due to a difference in channel feature and a difference in distance depending on a spatial limit. Further, since distances between the plurality of remote radio heads (RRHs) and the base station are different from each other, a difference in delay times of the source signals transferred to the base station may occur.

SUMMARY OF THE INVENTION

The present invention has been made in an effort to provide a base station and a communication system, and a coordinated communication method of the base station which can acquire an optimal receiving gain for a signal received by the base station.

The technical objects of the present invention are not limited to the aforementioned technical objects, and other technical objects, which are not mentioned above, will be apparent to those skilled in the art from the following description.

An exemplary embodiment of the present invention provides a base station that performs coordinated communication with a plurality of remote radio heads (RRHs), including: a communication unit receiving source signals from the plurality of remote radio heads; a measurement unit measuring signal intensities and delay times of the respective source signals; a selection unit selecting remote radio heads that will perform the coordinated communication among the plurality of remote radio heads based on the signal intensities and the delay times; and a demodulation unit demodulating source signals received from the selected remote radio heads.

The selection unit may decide a remote radio head that transmits a source signal having the largest signal intensity among the plurality of remote radio heads as a first remote radio head.

The selection unit may decide a delay time of a source signal received from the first remote radio head as a reference delay time and calculate differences between delay times of source signals received from other remote radio heads except for the first remote radio head among the plurality of remote radio heads and the reference delay time, respectively.

The selection unit may select a predetermined number of remote radio heads according to the order in which the difference is small among the other remote radio heads to decide the selected remote radio heads as a second remote radio head.

The selection unit may select the first remote radio head and the second remote radio head as the remote radio heads that will perform the coordinated communication.

The selection unit may exclude a remote radio head having a delay time corresponding to a difference which deviates from a predetermined range among the differences from the second remote radio head.

Another exemplary embodiment of the present invention provides a coordinated communication method of a base station that performs coordinated communication with a plurality of remote radio heads (RRHs), including: receiving source signals from the plurality of remote radio heads; measuring signal intensities and delay times of the respective source signals; selecting remote radio heads that will participate in the coordinated communication among the plurality of remote radio heads based on the signal intensities and the delay times; and demodulating source signals received from the selected remote radio heads.

The selecting of the remote radio heads that will participate in the coordinated communication among the plurality of remote radio heads based on the signal intensities and the delay times may include selecting a delay time of a first remote radio head that transmits a source signal having the largest signal intensity as a reference delay time, calculating differences between delay times of other remote radio heads except for the first remote radio head among the plurality of remote radio heads and the reference delay time, respectively, and selecting a predetermined number of second remote radio heads according to the order in which the difference is small among the other remote radio heads.

In the receiving of the source signals from the plurality of remote radio heads, the source signals may be simultaneously or sequentially received from the plurality of remote radio heads.

Yet another exemplary embodiment of the present invention provides a communication system including: a plurality of remote radio heads receiving source signals received from a terminal, respectively; and a base station measuring signal intensities and delay times of the respective source signals transferred through the plurality of remote radio heads and selecting remote radio heads that will participate in coordinated communication among the plurality of remote radio heads based on the signal intensities and the delay times.

According to exemplary embodiments of the present invention, a base station and a communication system, and a coordinated communication method of the base station can acquire an optimal receiving gain for a signal received by the base station.

The exemplary embodiments of the present invention are illustrative only, and various modifications, changes, substitutions, and additions may be made without departing from the technical spirit and scope of the appended claims by those

Figure 1:
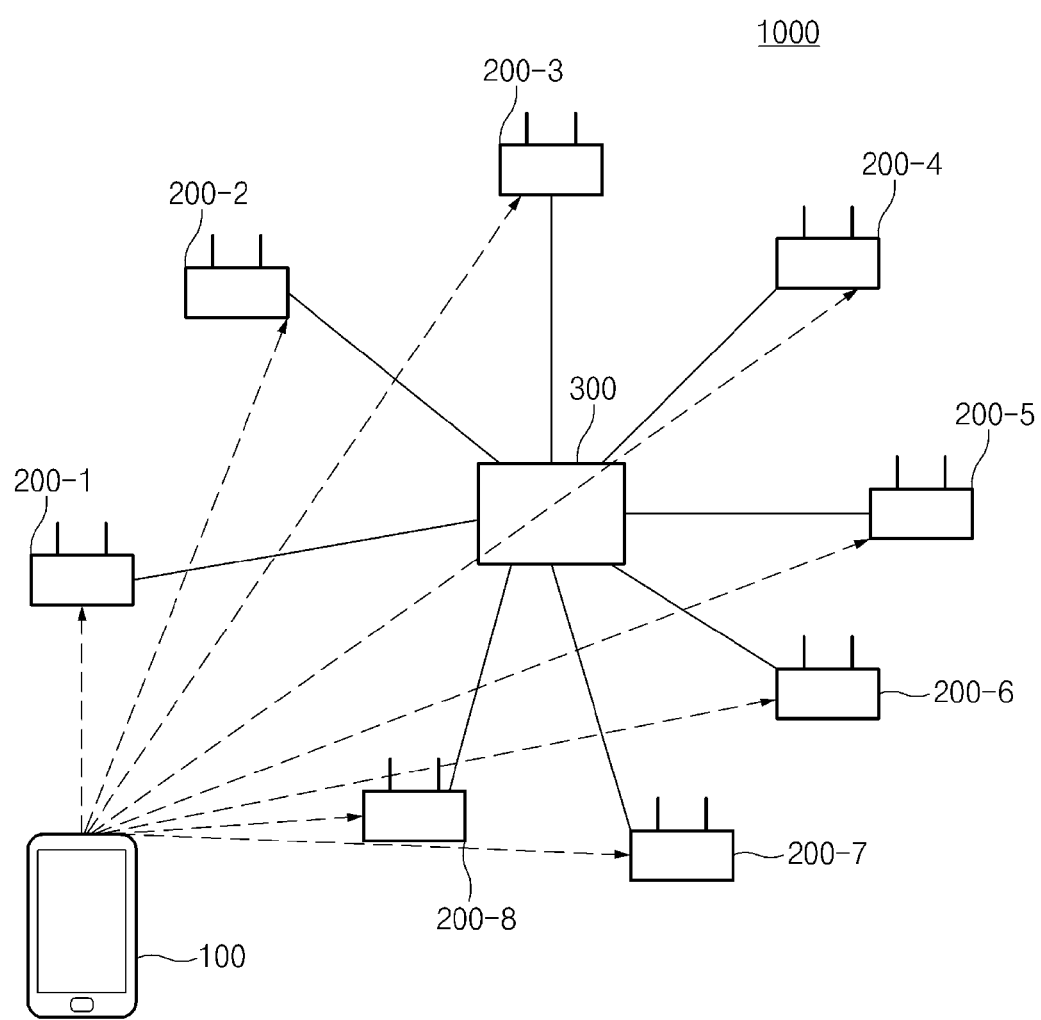
FIG. 1 illustrates a communication system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the accompanying drawings. When reference numerals refer to components of each drawing, it is to be noted that although the same components are illustrated in different drawings, the same components are referred to by the same reference numerals as possible. In describing the exemplary embodiments of the present invention, when it is determined that the detailed description of the known configuration or function related to the present invention may obscure the understanding of the present invention, the detailed description thereof will be omitted.

Terms such as first, second, A, B, (a), (b), and the like may be used in describing the components of the exemplary embodiments of the present invention. The terms are only used to distinguish a constituent element from another constituent element, but nature or an order of the constituent element is not limited by the terms.

FIG. 1 illustrates a communication system according to an exemplary embodiment of the present invention.

Referring to FIG. 1, the communication system 1000 according to the exemplary embodiment of the present invention may include a plurality of remote radio heads 200-1 to 200-8 that receives source signals from a terminal 100, respectively and a base station 300.

The terminal 100 as an electronic apparatus that transmits the source signals to the plurality of remote radio heads 200-1 to 200-8 by using a wireless communication network may include, for example, a smart phone, a tablet PC, a notebook, a handheld, a PDA, and the like.

The remote radio heads 200-1 to 200-8 may transfer the source signals received from the terminal 100 to the base station 300, respectively. For example, the plurality of remote radio heads 200-1 to 200-8 may transfer the source signals to the base station 300 through an optical cable. The plurality of remote radio heads 200-1 to 200-8 is disposed at different spatial positions, respectively to transfer the source signals received from the terminal 100 to the base station 300. Eight plural remote radio heads 200-1 to 2008 are illustrated in FIG. 1, but the remote radio heads 200-1 to 200-8 are just an example and the number of and deployment of the plurality of remote radio heads 200-1 to 200-8 are not limited thereto.

The base station 300 may measure signal intensities and delay times of the respective source signals received from the plurality of remote radio heads 200-1 to 200-8 and select remote radio heads to perform coordinated communication (coordinated multi-point, CoMP) by using the measured signal intensities and delay time. The base station 300 may demodulate the source signals received through the selected remote radio heads.

Since the plurality of remote radio heads 200-1 to 200-8 receives the source signals from the terminal 100 at different positions, the signal intensities and delay times of the source signals received in the plurality of remote radio heads 200-1 to 200-8 may be different due to the difference in channel feature and the difference in distance depending on the spatial limit. Further, since distances between the plurality of remote radio heads 200-1 to 200-8 and the base station 300 are different from each other, a difference in delay times of the source signals transferred to the base station 300 may occur.

Therefore, receiving gains of the source signals received by the base station 300 may be decided according to how to select the remote radio heads that participate in coordinated communication. As a result, the base station 300 of the communication system 1000 according to the exemplary embodiment of the present invention may select the remote radio heads that will participate in the coordinated communication among the plurality of remote radio heads 200-1 to 200-8 based on the signal intensities and delay times of the source signals transferred from the plurality of remote radio heads 200-1 to 200-8 and demodulate the source signals received from the selected remote radio heads. Accordingly, the communication system 1000 according to the exemplary embodiment of the present invention may acquire an optimal receiving gain for the source signals transferred to the base station 300. Hereinafter, this will be described in more detail with reference to FIGS. 3 to 6.

Figure 2:
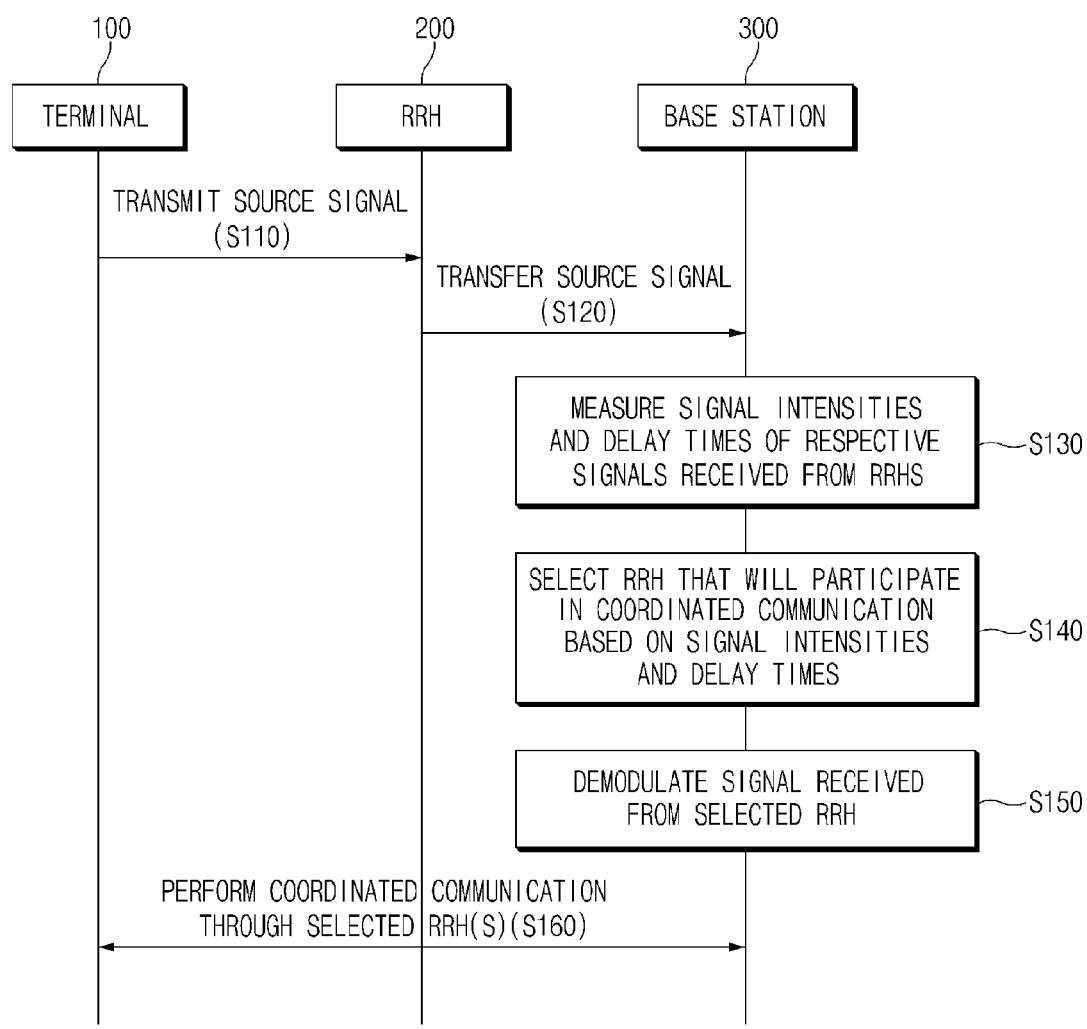
FIG. 2 is a diagram for describing an operation method of a communication system according to an exemplary embodiment of the present invention.

FIG. 2 is a diagram for describing an operation method of a communication system according to an exemplary embodiment of the present invention.

Referring to FIG. 2, the operation method of the communication system according to the exemplary embodiment of the present invention may include transmitting source signals from the terminal 100 to the remote radio heads (RRHs) 200 (S110), transferring the source signals to the base station 300 from the remote radio heads (RRHs) 200, respectively (S120), measuring signal intensities and delay times of the respective source signals received from the remote radio heads (RRHs) 200 (S130), selecting remote radio heads (RRHs) that will participate in coordinated communication based on the measured signal intensities and time delay (S140), demodulating the source signals received from the selected remote radio heads (RRHs) (S150), and performing the coordinated communication through the selected remote radio heads (RRHs) (S160).

Hereinafter, steps S110 to S160 described above will be described in detail with reference to FIG. 1.

First, in step S110, the terminal 100 may transmit the source signals to the plurality of remote radio heads 200-1 to 200-8.

In step S120, the plurality of remote radio heads 200-1 to 200-8 may transfer the source signals received from the terminal 100 to the base station 300, respectively. For example, the plurality of remote radio heads 200-1 to 200-8 may transfer the source signals to the base station 300 through an optical cable by converting the source signals into a form of an optical signal.

In step S130, the base station 300 may measure the signal intensities and delay times of the respective source signals received from the plurality of remote radio heads 200-1 to 200-8.

In step S140, the base station 300 may select the remote radio heads that will participate in the coordinated communication among the plurality of remote radio heads 200-1 to 200-8 based on the measured signal intensities and delay times.

In step S150, the base station 300 may demodulate the source signals received through the selected remote radio heads.

In step S160, the base station 300 may perform the coordinated communication through the selected remote radio heads.

Figure 3:
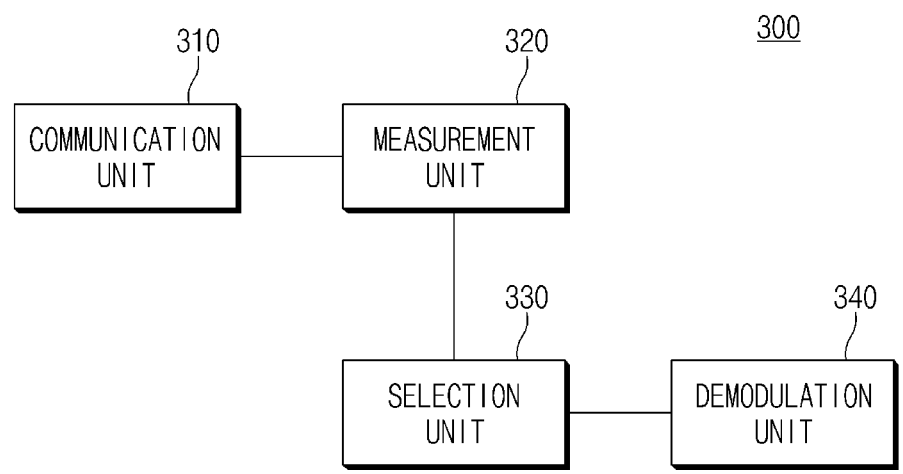
FIG. 3 is a block diagram illustrating a base station according to an exemplary embodiment of the present invention.
Figure 4:
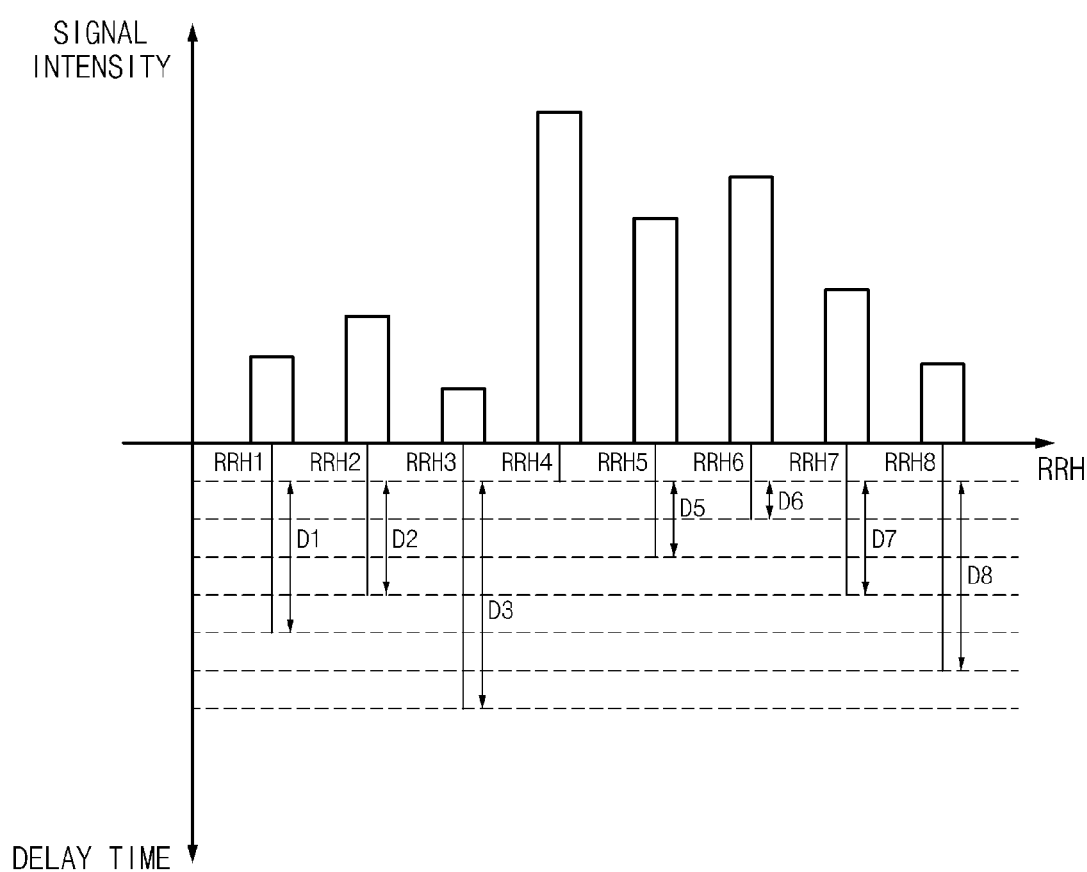
FIG. 4 is a diagram for describing an operation of a selection unit of the base station according to the exemplary embodiment of the present invention.

FIG. 3 is a block diagram illustrating a base station according to an exemplary embodiment of the present invention. FIG. 4 is a diagram for describing an operation of a selection unit of the base station according to the exemplary embodiment of the present invention.

First, referring to FIG. 3, the base station 300 according to the exemplary embodiment of the present invention may include a communication unit 310, a measurement unit 320, a selection unit 330, and a demodulation unit 340.

The communication unit 310 may receive the source signals from the plurality of remote radio heads 200-1 to 200-8, respectively.

The measurement unit 320 may measure the signal intensities and delay times of the respective source signals received from the plurality of remote radio heads 200-1 to 200-8.

The selection unit 330 may select the remote radio heads that will perform the coordinated communication among the plurality of remote radio heads 200-1 to 200-8 based on the measured signal intensities and delay times.

In detail, referring to FIG. 4, the measured signal intensities and delay times of the source signals received from the plurality of remote radio heads 200-1 to 200-8, respectively are illustrated. For example, RRH1 to RRH8 may correspond to the plurality of remote radio heads 200-1 to 200-8 illustrated in FIG. 1, respectively.

The selection unit 330 may decide a remote radio head that transmits a source signal having the largest signal intensity among the plurality of remote radio heads 200-1 to 200-8 as a first remote radio head (e.g., RRH4).

The selection unit 330 may decide a delay time of the source signal received from the first remote radio head (e.g., RRH4) as a reference delay time and calculate differences D1, D2, D3, D5, D6, D7, and D8 between delay times of source signals received from other remote radio heads RRH1, RRH2, RRH3, RRH5, RRH6, RRH7, and RRH8 except for the first remote radio head RRH4 among the plurality of remote radio heads RRH1 to RRH8 and the reference delay time, respectively.

The selection unit 330 selects a predetermined number (e.g., two) of remote radio heads having a small difference among other remote radio heads RRH1, RRH2, RRH3, RRH5, RRH6, RRH7, and RRH8 according to a difference order to decide the selected remote radio heads as a second remote radio head (e.g., RRH5 or RRH6). Herein, the predetermined number may be decided based on the number of source signals which may be processed by the demodulation unit 340. Further, the selection unit 330 may exclude a remote radio head having a difference which deviates from a predetermined range among other remote radio heads from the second remote radio head. Herein, the predetermined range may be set by considering a protection interval of the source signal.

Consequently, the selection unit 330 may select the first remote radio head (e.g., RRH4) and the second remote radio heads (e.g., RRH5 and RRH6) as the remote radio heads that will participate in the coordinated communication.

Referring back to FIG. 3, the demodulation unit 340 may demodulate the source signals received from the selected first remote radio head (e.g., RRH4) and the second remote radio heads (e.g., RRH5 and RRH6).

That is, the base station 300 according to the exemplary embodiment of the present invention selects the remote radio head having the largest signal intensity among the plurality of remote radio heads 200-1 to 200-8 and the predetermined number of remote radio heads in the order in which the difference from the delay time of the source signal received from the remote radio head is smaller among the plurality of remote radio heads 200-1 to 200-8 to perform the coordinated communication. Accordingly, the base station 300 may acquire an optimal receiving gain for the transferred source signals.

Figure 5:
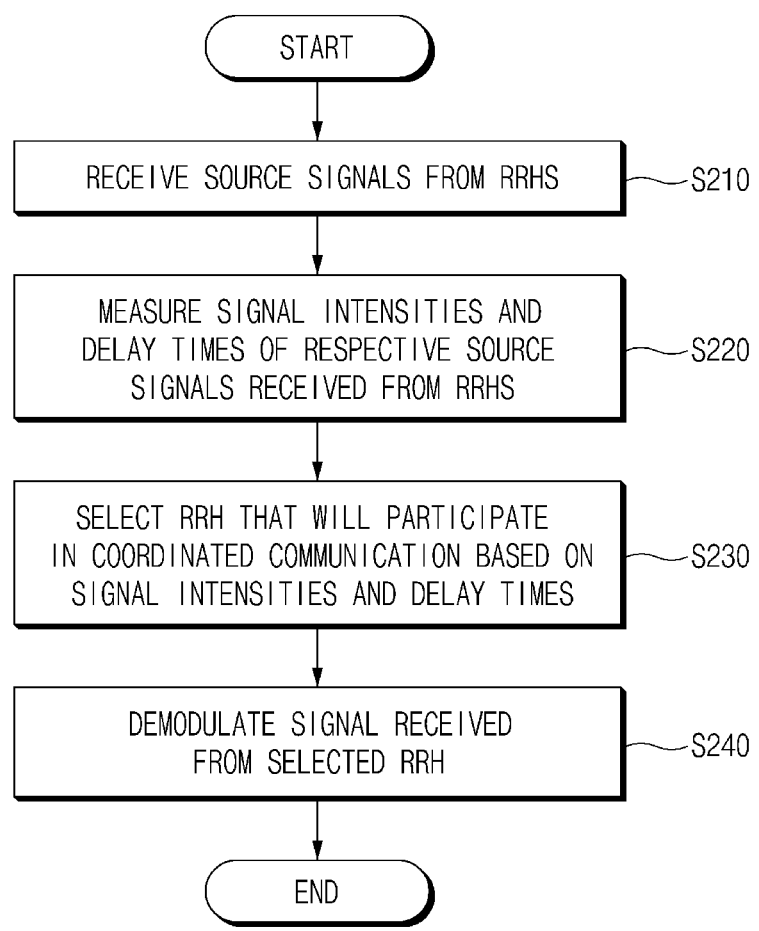
FIG. 5 is a flowchart illustrating a coordinated communication method of a base station according to an exemplary embodiment of the present invention.
Figure 6:
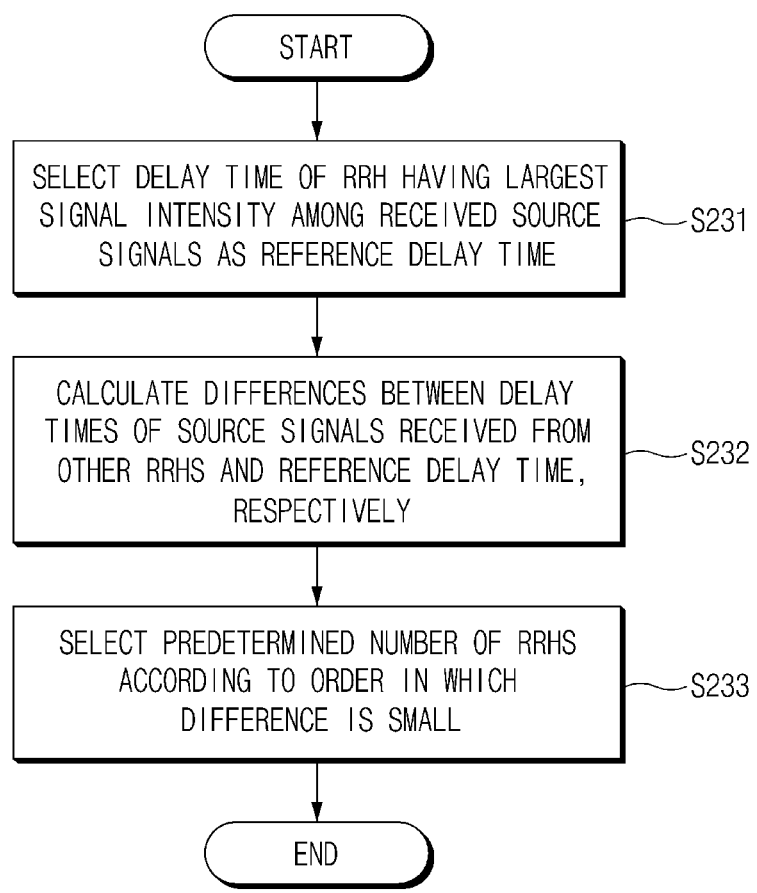
FIG. 6 is a flowchart, in more detail, illustrating the coordinated communication method of the base station according to the exemplary embodiment of the present invention.

FIG. 5 is a flowchart illustrating a coordinated communication method of a base station according to an exemplary embodiment of the present invention. FIG. 6 is a flowchart, in more detail, illustrating the coordinated communication method of the base station according to the exemplary embodiment of the present invention.

First, referring to FIG. 5, the coordinated communication method of the base station according to the exemplary embodiment of the present invention may include receiving source signals from a plurality of remote radio heads (RRHs) (S210), measuring signal intensities and delay times of the respective source signals (S220), selecting remote radio heads (RRHs) that will participate in coordinated communication based on the signal intensities and the delay times (S230), and demodulating source signals received from the selected remote radio heads (RRHs) (S240).

Hereinafter, steps S210 to S240 described above will be described in more detail with reference to FIG. 3.

In step S210, the communication unit 310 may receive the source signals from the plurality of remote radio heads 200-1 to 200-8.

In step S220, the measurement unit 320 may measure the signal intensities and delay times of the respective source signals received from the plurality of remote radio heads 200-1 to 200-8.

In step S230, the selection unit 330 may select the remote radio heads (RRHs) that will participate in the coordinated communication based on the measured signal intensities and delay times.

Meanwhile, referring to FIG. 6, step S230 may include selecting a delay time of a remote radio head (RRH) having the largest signal intensity among the received source signals as a reference delay time (S231), calculating differences between delay times of source signals received from other remote radio heads except for the remote radio head having the largest signal intensity among the plurality of remote radio heads 200-1 to 200-8 and the reference delay time, respectively (S232), and selecting a predetermined number of remote radio heads in the order in which the calculated differences are smaller among other remote radio heads (S233).

In step S231, the selection unit 330 may decide a remote radio head that transmits a source signal having the largest signal intensity among the plurality of remote radio heads 200-1 to 200-8 as a first remote radio head. The selection unit 330 may decide a delay time of a source signal received from the first remote radio head as the reference delay time.

In step S232, the selection unit 330 may calculate differences between delay times of the source signals received from other remote radio heads except for the first remote radio head among the plurality of remote radio heads 200-1 to 200-8 and the reference delay time, respectively.

In step S233, the selection unit 330 selects a predetermined number of remote radio heads having a small difference among other remote radio heads according to the order of the difference to decide the selected remote radio heads as a second remote radio head. The selection unit 330 may select the first remote radio head and the second remote radio heads as the remote radio heads that will participate in the coordinated communication.

Referring back to FIG. 5, in step S240, the demodulation unit 340 may demodulate the source signals received from the selected remote radio heads.

Steps of a method or an algorithm described in association with the exemplary embodiments disclosed in the specification may be directly implemented by hardware and software modules executed by the processor, or a combination thereof. The software module may reside in a RAM memory, a flash memory, a ROM memory, an EPROM memory, an EEPROM memory, a register, a hard disk, a removable disk, a CD-ROM, or predetermined other forms of storage media. The exemplary storage medium is coupled to the processor and the processor may read information from the storage medium and write the information in the storage medium. As another method, the storage medium may be integrated with the processor. The processor and the storage medium may reside in an application specific integrated circuit (ASIC). The ASIC may reside in a user terminal. As yet another method, the processor and the storage medium may reside in the user terminal as individual components.

The technical spirit of the present invention have been just exemplarily described in the above description, and various changes and modifications may be made by those skilled in the art to which the present invention pertains without departing from the intimate feature of the present invention. Accordingly, the embodiments disclosed herein are intended not to limit but to describe the technical spirit of the present invention, and the scope of the technical spirit of the present invention is not limited to the embodiments. The scope of the present invention may be interpreted by the appended claims and all the technical spirits in the equivalent range thereto are intended to be embraced by the claims of the present invention.

What is claimed is:

1. A base station for performing coordinated communication with a plurality of remote radio heads, comprising:
   a processor; and
   a non-transitory storage medium containing program instructions, execution of which by the processor causes the base station to provide functions of:
   a communication unit receiving source signals from the plurality of remote radio heads;
   a measurement unit measuring signal intensities and delay times of the received source signals;
   a selection unit selecting ones of the remote radio heads that will perform the coordinated communication, among the plurality of remote radio heads, based on the signal intensities and the delay times; and
   a demodulation unit demodulating source signals received from the selected ones of the remote radio heads.

2. The base station of claim 1, wherein the selection unit decides one of the remote radio heads that transmits a source signal having the largest signal intensity among the plurality of remote radio heads as a first remote radio head.

3. The base station of claim 2, wherein the selection unit decides a delay time of a source signal received from the first remote radio head as a reference delay time, and calculates a plurality of differences each between the reference delay time and a delay time of a source signal received from one of the plurality of remote radio heads other than the first remote radio head.

4. The base station of claim 3, wherein the selection unit selects a predetermined number of the remote radio heads, among the plurality of remote radio heads, that have smaller differences than the others of the remote radio heads, as being second remote radio heads.

5. The base station of claim 4, wherein the selection unit selects the first remote radio head and the second remote radio heads as the remote radio heads that will perform the coordinated communication.

6. The base station of claim 4, wherein the selection unit excludes one of the remote radio heads having a delay time corresponding to one of the differences which deviates from a predetermined range from the second remote radio heads.

7. A coordinated communication method of a base station that performs coordinated communication with a plurality of remote radio heads (RRHs), the method comprising:
   receiving source signals from the plurality of remote radio heads;
   measuring signal intensities and delay times of the respective source signals;
   selecting remote radio heads that will participate in the coordinated communication among the plurality of remote radio heads based on the signal intensities and the delay times; and
   demodulating source signals received from the selected remote radio heads.

8. The method of claim 7, wherein the selecting of the remote radio heads that will participate in the coordinated communication among the plurality of remote radio heads based on the signal intensities and the delay times includes:
   selecting a delay time of a first remote radio head that transmits a source signal having the largest signal intensity as a reference delay time;
   calculating differences between delay times of other remote radio heads except for the first remote radio head among the plurality of remote radio heads and the reference delay time, respectively; and
   selecting a predetermined number of second remote radio heads according to the order in which the difference is small among the other remote radio heads.

9. The method of claim 7, wherein in the receiving of the source signals from the plurality of remote radio heads, the source signals are simultaneously or sequentially received from the plurality of remote radio heads.

10. A communication system comprising:
    a plurality of remote radio heads receiving source signals received from a terminal, respectively; and
    a base station measuring signal intensities and delay times of the respective source signals transferred through the plurality of remote radio heads and selecting remote radio heads that will participate in coordinated communication among the plurality of remote radio heads based on the signal intensities and the delay times.

* * * * *